United States Patent [19]

Roach

[11] 4,003,215
[45] Jan. 18, 1977

[54] ABSORPTION REFRIGERATION SYSTEM

[75] Inventor: John Robert Roach, Adelaide, Australia

[73] Assignee: University of Adelaide, Adelaide, Australia

[22] Filed: June 20, 1975

[21] Appl. No.: 588,805

[30] Foreign Application Priority Data

June 24, 1974 Australia .................... 7945/74

[52] U.S. Cl. .................................................. 62/476
[51] Int. Cl.$^2$ ...................................... F25B 15/00
[58] Field of Search ............... 62/112, 476; 252/67

[56] References Cited

UNITED STATES PATENTS

| | | | |
|---|---|---|---|
| 3,183,680 | 5/1965 | Billi ..................................... | 62/112 |
| 3,312,078 | 4/1967 | Aerov et al. ......................... | 62/112 |
| 3,505,232 | 4/1970 | Murphy et al. ...................... | 62/112 |
| 3,505,233 | 4/1970 | Clark et al. .......................... | 62/112 |

Primary Examiner—Lloyd L. King
Attorney, Agent, or Firm—Jay L. Chaskin

[57] ABSTRACT

An absorption refrigeration system utilizing a pair of refrigerant fluids one of which constitutes a distillate, the other of which constitutes an absorber, the fluids being separated from one another in a closed circuit, by a distillation process, the more volatile vapor phase (namely the distillate) being condensed to form a liquid phase, expanded, evaporated, and re-absorbed in the less volatile product (namely the absorbent) of the distillation process, each of the refrigerant fluids being a fluoro-carbon compound, the differences of respective boiling points of said pair of fluids being substantially smaller than the corresponding boiling point temperature difference pertaining to the ammonia/water absorption system, the system being characterized in that it is able to operate with a higher temperature cooling medium for the distillation column condenser while utilizing a lower grade of heat in the distillation column re-boiler.

6 Claims, 1 Drawing Figure

ABSORPTION REFRIGERATION SYSTEM

This invention relates to an absorption refrigeration system which can be used for air conditioning (cooling) and space heating wherein fluids are separated from one another in a closed circuit by a distillation process, the more volatile vapour phase (distillate) being condensed to form a liquid phase, expanded, evaporated and re-absorbed in the less volatile (bottom) product of the distillation process. The evaporation of the condensed distillate provides the cooling effect for refrigeration and air conditioning purposes and the heat removed from the vapour phase condenser and the absorption step may be used if space heating is required.

BACKGROUND OF THE INVENTION

Absorption refrigeration and air conditioning systems are in common use and there are known mixtures of absorbents (bottom product) and refrigerants (distillate) with useful properties. One commonly used absorbent/refrigerant pair of fluids is water and ammonia (in some cases with a tertiary gas, for example hydrogen), the ammonia being separated from the water by a distillation process within a heated column, the ammonia gas then being condensed, passed through an expansion valve, evaporated to provide a cooling effect and then re-absorbed into the separated water stream passed out from the bottom of the distillation column.

Heretofore it has been customary to select refrigerants and absorbent fluids having quite separate and different desirable properties.

The operating conditions of temperature and pressure in the distillation column are dictated both by the nature of the absorbent and refrigerant fluids used in the system and by two external factors, namely first the temperature of the heat source available to supply thermal energy to the distillation column re-boiler, and second the available heat sink temperature of the cooling medium which is used to remove heat from the distillation column condenser and the absorber. For example at a pressure of 100 p.s.i. absolute ammonia distillate will boil (or condense) at about 14° C., and the water bottom product exiting from the reboiler will boil at about 167° C., the difference between these temperatures being more than 150° C. The mixed liquids usually boil at an intermediate temperature depending on proportions.

The main object of this invention is to provide an absorption refrigeration system which can operate on "low grade" heat, and which can be used in conjunction with air conditioning.

The achievement of a distillation system operating on low grade heat enables thermal energy at a lower temperature to be used to separate the components in the distillation column while still maintaining a cooling medium temperature in the ambient range for the distillation column condenser.

One of the problems associated with all equipment such as distillation columns, absorbers, and heat exchangers where a vapour phase is involved is the effect of the vapour density on the size, and hence cost, of such equipment. A further object of the system is to achieve all the functions of refrigeration, air conditioning, and space heating with equipment of reduced physical size.

A still further problem that occurs in conventional systems such as the ammonia/water absorption system or the water/lithium bromide absorption system is that special precautions involving additional expense have to be taken to minimize corrosion within the system. A still further object of this invention is to provide a system wherein the dangers of corrosion have been substantially reduced.

Further the systems containing ammonia present hazards both from the point of view of toxicity and flammability. Yet another object of this invention is to provide a system wherein the dangers of accidental exposure of personnel to toxic and flammability hazards are substantially reduced.

In this invention there is a departure from the concept of the need for refrigerant and absorbent fluids to have quite separate and different desirable properties, and this invention makes use of fluids having properties which have heretofore appeared too similar to be useful in an absorption cycle.

BRIEF SUMMARY OF THE INVENTION

Briefly this invention includes an absorption refrigeration system which utilizes a pair of refrigerant fluids one of which constitutes the distillate (which is used as a refrigerant) the other of which is not used as a refrigerant but constitutes the absorbent, each of said fluids being a fluoro-carbon compound, and wherein the difference of respective boiling points of said pair of fluids, is substantially smaller than the corresponding boiling point temperature difference pertaining to the ammonia/water system for the same distillation column operating pressure.

More specifically, this invention includes an absorption refrigeration system utilising a pair of refrigerant fluids, each of which is a fluorocarbon compound, the difference between respective boiling points of said fluids, at a given pressure, lies in the range 30°–60° C. Since the difference of temperatures of boiling points of the fluids is comparatively small (that is when compared to the temperature difference of the corresponding ammonia/water system) use can be made of low grade heat, under normal conditions, even as low as 60° C., (provided a suitable low temperature cooling medium is available such as in a cascade system).

A system utilising a pair of fluids having a boiling point range difference as described hereinabove has the advantage of being able to operate with a higher temperature cooling medium for the distillation column condenser while making use of a lower grade of heat in the distillation column reboiler, notwithstanding the fact that the operating pressure may be different to that in the ammonia/water system. This cooling medium for example, may be air (including air precooled by an evaporative cooler) rather than water or other liquid in certain circumstances and the air may then be used for cooling both the distillation column condenser and the absorber unit. Relatively low grade heat (that is, temperatures between ambient and 120° C.) can, for example be obtained from flat plate solar heating equipment, waste heat from the water cooling system of an internal combustion engine, waste heat from the discharged water from a boiler, low pressure steam, hot flue or exhaust gas or by other readily available means.

Further in certain circumstances the use of air as a cooling medium for both the distillation column condenser and the absorber unit gives rise to two particular advantages. Firstly, it enables the absorption system to operate as a refrigerator or air conditioning system without the use of an auxiliary water cooling tower system, and secondly, by passing air through the respective heat exchangers namely the condenser and the absorber, the hot air may be passed from one locality to another and may for example be used for space heating purposes. Such a unit may therefore be used for refrigeration or air conditioning in the normal sense, the heat being rejected to the atmosphere. Alternatively it may be used for space heating, in which case additional heat is absorbed from the atmosphere or other suitable source and the total quantity of heating is therefore greater than the heat input to the system through the distillation column reboiler. This is known as the "heat pump" effect and a further advantage of this invention is that it enables a system using the absorption cycle to be able to utilise the heat pump effect in the transfer of heat to air, and for example, wherein air to be heated can pass through a condenser heat exchanger and an absorber heat exchanger, thereby gaining effectiveness which is additional to that usually gained when air to be heated is passed solely through a single hot fluid condenser heat exchanger. The fact that using air as a cooling medium in certain circumstances offers advantages does not diminish the use of the invention when it is more convenient to use water or other liquid as a cooling medium.

The operating fluids must be selected from those wherein the boiling temperature difference is relatively small yet not so small that separation by distillation is difficult. Further the mixture of fluids must not be azeotropic near the central portion of their effective mixture range (although some azeotropic properties may of course be tolerated).

The means for effecting re-cycling of the liquid mixture within the system may be mechanical (for example a pump or injector) or may constitute gravitational means, as is already known in large and small systems respectively.

BRIEF DESCRIPTION OF THE DRAWINGS

An embodiment of the invention is described hereunder in some further detail with reference to and as illustrated in the accompanying drawing, in which.

Figure 1:
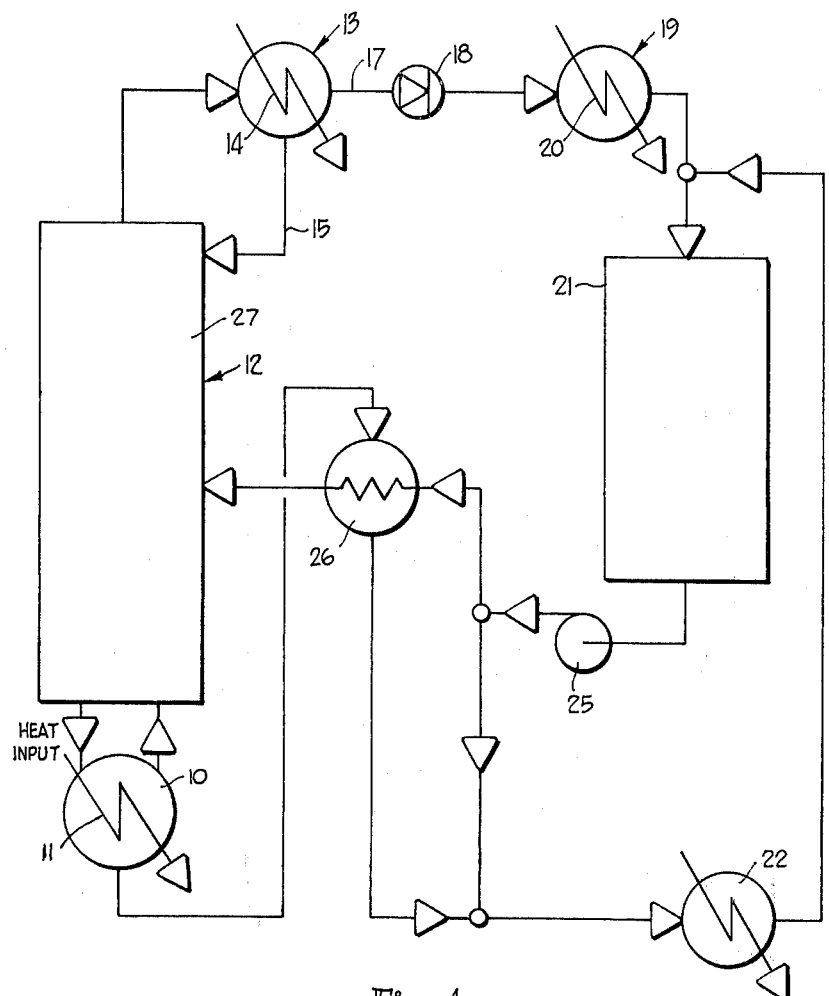
FIG. 1 is a schematic diagram of the absorption refrigeration system according to this invention.

Although it will be clear from a study of the boiling points and azeotropic properties which mixtures of fluids (both of which may be commonly known as "refrigerants") may be used in this invention, in this particular embodiment use is made of a pair of refrigerants selected from those known as the fluorocarbon type chemical compounds, and particularly useful pairs of fluorocarbon compounds are those whose compositions differ by one chlorine and one fluorine atom although the invention still has the advantages claimed for other pairs of fluids. Three pairs whose composition varies by one chlorine and one fluorine atom are R11 (trichlorofluoromethane) and R12 (dichlorodifluoromethane); R21 (dichloromonofluoromethane) and R22 (monochlorodifluoromethane); and R113 (trichlorotrifluorethane) and R114 (dichlorotetrafluoroethane).

These compounds are sold under the Registered Trade Marks "FREON 11," "FREON 12," "FREON 21," "FREON 22," "FREON 113," and "FREON 114" respectively. They are also sold under other Registered Trade Marks. The approximate respective atmospheric boiling points of each of these pairs compared with ammonia and water are:

water/ammonia (100° C./ − 33.4° C.); R11.R12 (23.7° C./ − 29.7° C.); R21/R22 (8.9° C./ − 40.8° C.); R113/R114 (47.5° C./ − 3.6° C).

For the purposes of this specification, the term "fluorocarbon" compounds is intended to include the cyclic organic fluorocarbon compounds C316 (dichlorohexafluorocyclo butane), C317 (monochloroheptafluorocyclo butane) and C318 (octafluorocyclobutane), the references C316, C317 and C318 being their respective refrigerant numbers.

It will be seen that all these refrigerant compounds are relatively non-toxic, non-flammable, and non-corrosive if kept dry. In addition they possess a high molecular weight and therefore the physical sizes of the equipment containing their vapour phase can be much less than in many previously proposed systems, for the same effective refrigeration capacity of the system.

The following description refers to the operation of the invention using the pair of compounds R11 and R12. (Alternatively use can be made of the pairs R21/R22, R113/R114 or any other suitable admixture of pairs of fluorocarbon refrigerants including those containing bromine atoms, reference to which pairs will be made hereinafter.

With reference to FIG. 1, the system according to this invention comprises a distillation column reboiler 10 having a heat exchanger 11 adapted to be heated by fluid, for example water heated by solar radiation, the heat exchanger being positioned beneath a distillation column 12 of known type. The distillation column 12 is arranged to distill most of the R12 from the R11, although it is probable that some of R11 will carry over to the R12 and some of the R12 will remain in the R11 at the column reboiler 10 to form a distillation residue. The refrigerant fluid R12 then is condensed in a condenser 13, itself comprising a condenser heat exchanger 14 arranged to be cooled by the passage of air (with or without entrained water). Some of the refrigerant fluid R12 is re-cycled back to the distillation column 12 via conduit 15 in accordance with known art, as shown for example, in Applied Process Design for Chemical and Petro-Chemical Plants, volume III, Ernest E. Ludwig, published by Gulf Publishing Co., Houston, Texas, 1965, on pages 177–179. The refrigerant fluid R12 passes through a conduit 17 which contains a pressure control valve (not shown) arranged to have the pressure raised during the summer months, and from the control valve the condensed refrigerant fluid passes through an expansion valve 18 and into an evaporator 19. The evaporator 19 comprises a further heat exchanger 20 and is arranged to take heat from the air. From the evaporator 19, the now evaporated refrigerant passes into an absorber 21, and in this embodiment the absorber 21 is provided with a heat exchanger 22 physically separated from the absorption unit 21, although it will be realised that the absorber may include a heat exchanger integral therewith. The heat exchanger 22 constitutes an absorber cooler and is arranged to maintain the vapour pressure of the fluid mxiture that is, distillation residue and refrigerant R12 in the absorber at a sufficiently low value to ensure vaporisation of the refrigerant R12 passing through the low temperature evaporator. The absorber 21 absorbs the evaporated refrigerant by a condensing process maintained by means of the heat exchanger 22 into the distillation residue (absorbent) and the liquid mixture may then pass via a feed heat exchanger 26 into the distillation column 12, the liquid mixture being re-cycled through the system by means of a pump 25 (or by an injector).

The distillation column 12 is constructed in accordance with known art and comprises an elongate column 27 arranged vertically having a series of evaporator plates (not shown) or a pervious packing through which the refrigerant (and re-cycled mixture) may pass.

The heat exchangers are arranged in conjunction with fans (not shown) for forcing the passage of air therethrough, the arrangement being such that for heating purposes the air passes through the condenser and absorber heat exchanger, thereby effectively increasing the amount of heat transmitted to the air to be heated over and above that which would be obtained if the heat input to the re-boiler 10 was used directly. In this respect the efficiency is also improved. In the event that the air required is to be cooled (for the cooling of buildings, for example), the air passing over the condenser and absorber is discharged to atmosphere and a further supply of air passes through the evaporator into the space to be cooled.

Listed hereunder is a table of suitable pairs of fluorocarbon refrigerant fluids which can be utilized in the absorption system according to this invention, together with (absolute) atmospheric boiling point differences between the fluids for each pair:

It will be realized by those skilled in the art that the operating pressure in the condenser is governed by the limitations on the condensing temperature imposed by the cooling medium. Pressures of up to approximately 300 p.s.i. can be used for this system, without any due concern to structural safety requirements.

A consideration of the above embodiment will indicate that the invention is simple. The temperatures required for successful operation are not high, and therefore water heated by solar radiation or by the heat from the radiator or exhaust of an internal combustion engine for the purpose of distilling the refrigerant fluid from the mixture of fluids could be utilized. The system of this invention provides distinct advantages in certain applications over both the ammonia-water absorption system and the lithium bromide-water absorption system. For example in comparison with the ammonia-water system, the present system utilizes a "lower grade" of heat and uses non-toxic, non-corrosive and non-flammable fluids while with respect to the lithium bromide-water system, a significant reduction in equipment size is achieved by the high molecular weight fluids at moderate pressures compared to relatively low molecular weight fluid at low pressure used in the lithium bromide-water system.

These particular advantages are advantageous in air-conditioning vehicles where only limited space is available, such as automobiles, buses and the like. Furthermore, the present invention provides a system

| EXAMPLE NO. | TYPE | CHEMICAL NAMES | ATMOSPHERIC BOILING POINT DIFFERENCES ° C |
|---|---|---|---|
| 1. | R11/R12 | Trichloromonofluoro-methane/ Dichlorodifluoromethane | 53 |
| 2. | R11/C318 | See 1 above / Octafluorocyclobutane | 30 |
| 3. | R11/C316 | See 1 above / Dichlorohexafluorocyclobutane | 36 |
| 4. | R12/R13 | Dichlorodifluoromethane/ Monochlorotrifluoromethane | 51 |
| 5. | R12/R23 | See 4 above / Trifluoromethane | 54 |
| 6. | R12/R114 | See 4 above / Dichlorotetrafluoroethane | 34 |
| 7. | R12/C317 | See 4 above / Monochloroheptafluorocyclobutane | 55 |
| 8. | R12B1/ R13B1 | Bromochlorodifluoromethane/ Monobromotrifluoromethane | 54 |
| 9. | R12B1/R22 | See 8 above/Monochlorodifluoromethane | 37 |
| 10. | R12B1/R113 | See 8 above/Trichlorotrifluoroethane | 52 |
| 11. | R12B1/R115 | See 8 above/Monochloropentafluoroethane | 35 |
| 12. | R13/R22 | See 4 above/See 9 above | 41 |
| 13. | R13/R115 | See 4 above/See 11 above | 42 |
| 14. | R13B1/C318 | See 8 above/See 2 above | 52 |
| 15. | R22/R23 | See 9 above/See 5 above | 41 |
| 16. | R22/R114 | See 9 above/See 6 above | 45 |
| 17. | R22/C318 | See 9 above/See 2 above | 35 |
| 18. | R23/R115 | See 5 above/See 11 above | 43 |
| 19. | R113/R114 | See 10 above/See 6 above | 44 |
| 20. | R113/C318 | See 10 above/See 2 above | 54 |
| 21. | R114/C316 | See 6 above/See 3 above | 56 |
| 22. | R114/R115 | See 6 above/See 11 above | 43 |
| 23. | C318/C317 | See 2 above/See 7 above | 31 |
| 24. | C318/R115 | See 2 above/See 11 above | 33 |
| 25. | C316/C317 | See 3 above/See 7 above | 35 |

It is preferred to use those pairs of fluids whose respective boiling point differences lie in the range 35°–55° C., and still more preferred are those whose respective boiling point differences lie in the range 40°–50° C.

which can be used in vehicle air-conditioning equipment wherein the total quantity of constructional materials is less and hence the cost is less.

I claim:

1. In an absorption refrigeration system utilizing a pair of fluids, said system comprising:

a distillation column, a distillation column heat exchanger for introducing heat into the distillation column for distilling one of said fluids from the other said fluid to form a distilled fluid and a distillation residue, a condenser heat exchanger in fluid flow communication with said distillation column and arranged for condensing of the distilled fluid to produce a condensate, an expansion valve through which passes said condensate, an evaporator heat exchanger for evaporation of the condensate, an absorber and an absorber heat exchanger in fluid flow communication with said evaporator heat exchanger, wherein the evaporated condensate is absorbed into the distillation residue to thereby form a liquid mixture, said absorber heat exchanger being arranged to maintain the vapour pressure in the absorber, below the vapour pressure in the distillation column, and means to effect re-cycling of said liquid mixture within the system, the improvement wherein each fluid of said pair of fluids is a fluorocarbon compound having refrigerant properties, said fluids having different boiling points, and the absolute difference between respective boiling points of said fluids, at a given pressure, lies in the range of 30°–60° C, and the system operates (a) at a temperature for said condenser heat exchanger which is higher than is required when the boiling point difference is other than 30°–60° C and (b) with a grade of heat in said distillation column heat exchanger which is lower than is required when said boiling point difference is other than 30°–60° C.

2. An absorption refrigeration system according to claim 1 wherein the absolute difference between respective boiling points of said fluids, at a given pressure, lies in the range of 35°–55° C.

3. An absorption refrigeration system according to claim 1 wherein the absolute difference between respective boiling points of said fluids, at a given pressure lies in the range of 40°–50° C.

4. An absorption refrigeration system according to claim 2 wherein said pair of fluids is selected from the group consisting of the following pairs of fluoro-carbon compounds:

Trichloromonofluoromethane/Dichlorodifluoromethane; Trichloromonofluoromethane/Dichlorohexafluorocyclobutane; Dichlorodifluoromethane/Monochlorotrifluoromethane; Dichlorodifluoromethane/Trifluoromethane; Dichlorodifluoromethane/Monochloroheptafluorocyclobutane; Bromochlorodifluoromethane/Monobromotrifluoromethane; Bromochlorodifluoromethane/Monochlorodifluoromethane; Bromochlorodifluoromethane/Trichlorotrifluoroethane; Bromochlorodifluoromethane/Monochloropentafluoroethane; Monochlorotrifluoromethane/Monochlorodifluoromethane; Monochlorotrifluoromethane/Monochloropentafluoroethane; Monobromotrifluoromethane/Octafluorocyclobutane; Monochlorodifluoromethane/Trifluoromethane; Monochlorodifluoromethane/Dichlorotetrafluoroethane; Monochlorodifluoromethane/Octafluorocyclobutane; Trifluoromethane/Monochloropentafluoroethane; Trichlorotrifluoroethane/Dichlorotetrafluoroethane; Trichlorotrifluoroethane/Octafluorocyclobutane; Dichlorotetrafluoroethane/Monochloropentafluoroethane; Dichlorohexafluorocyclobutane/Monochloroheptafluorocyclo-butane.

5. An absorption refrigeration system according to claim 3 wherein said pair of fluids is selected from the group consisting of the following pairs of fluorocarbon compounds:

Monochlorotrifluoromethane/Monochlorodifluoromethane; Monochlorotrifluoromethane/Monochloropentafluoroethane; Monochlorodifluoromethane/Trifluoromethane; Monochlorodifluoromethane/Dichlorotetrafluoroethane; Trifluoromethane/Monochloropentafluoroethane; Trichlorotrifluoroethane/Dichlorotetrafluoroethane; Dichlorotetrafluoroethane/Monochloropentafluoroethane.

6. An absorption refrigeration system according to claim 1 wherein the pair of fluorocarbon compounds differ by one chlorine and one fluorine atom.

* * * * *